Figure 13:
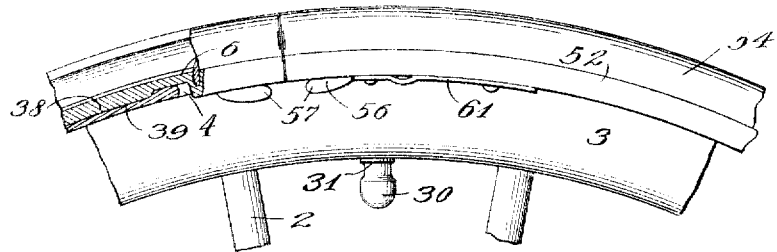

R. S. BRYANT.
RIM FOR VEHICLE WHEELS.
APPLICATION FILED MAY 4, 1911.
1,268,210.
Patented June 4, 1918.
3 SHEETS—SHEET 1.
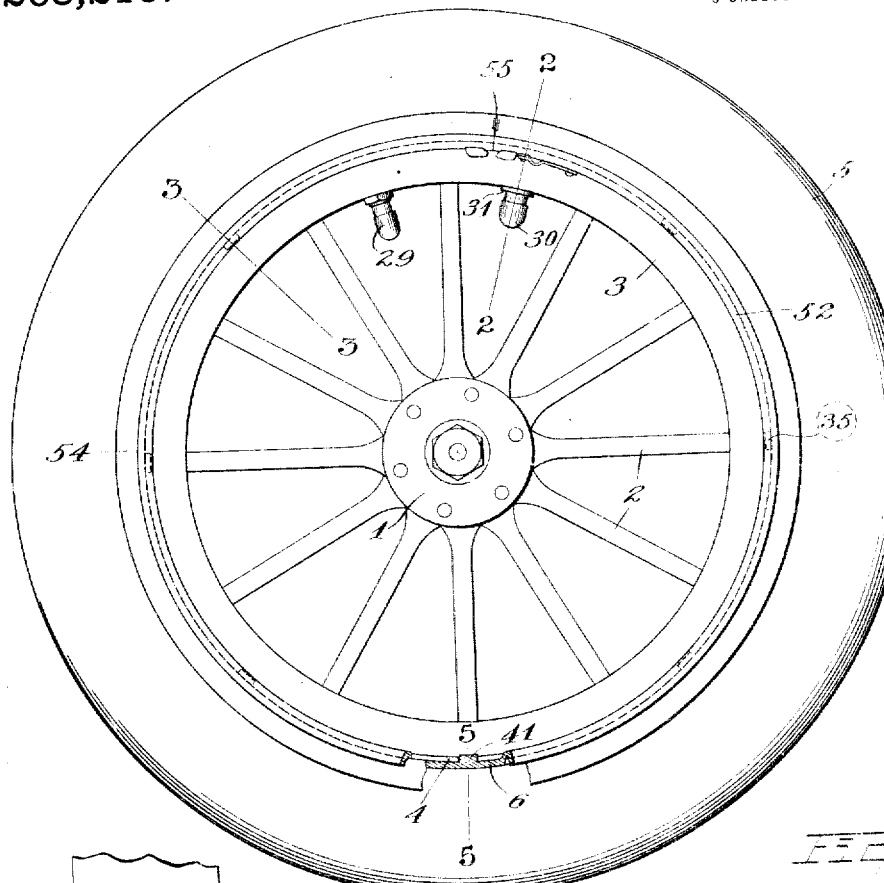
Fig. 1
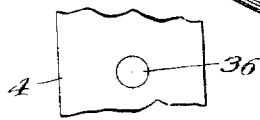
Fig. 4
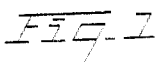
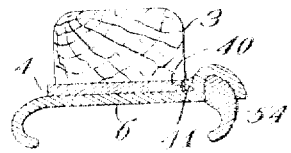
Fig. 5
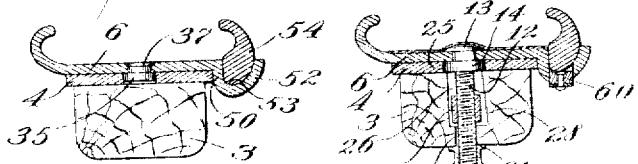
Fig. 3
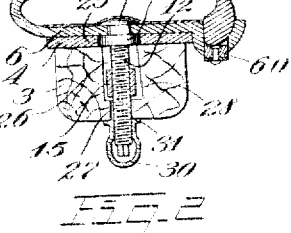
Fig. 2
Witnesses:
Inventor.
Richard S. Bryant
By Hull & Smith
Attys

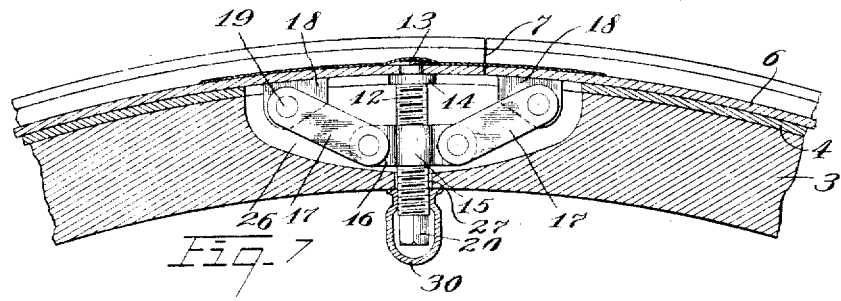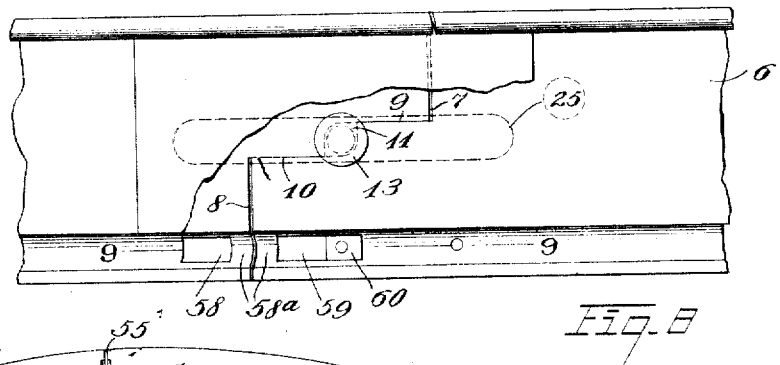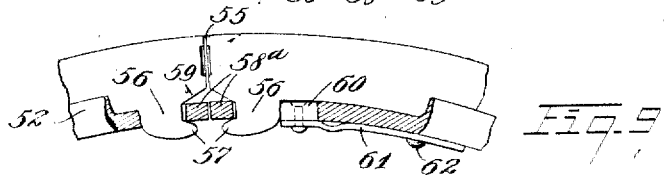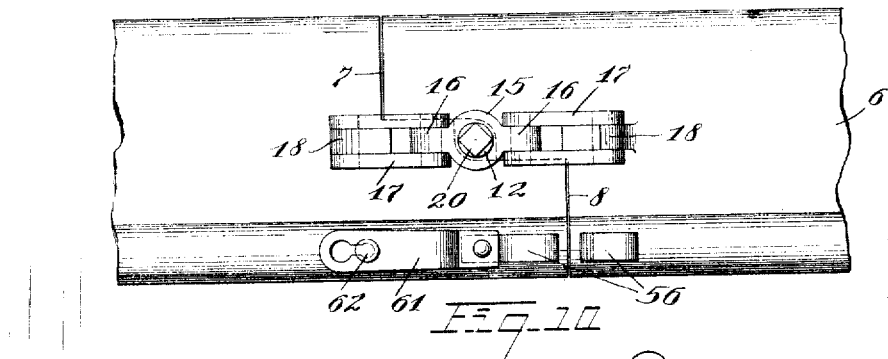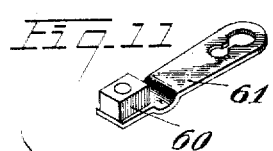

UNITED STATES PATENT OFFICE.

RICHARD S. BRYANT, OF AKRON, OHIO, ASSIGNOR, BY MESNE ASSIGNMENTS, TO THE STANDARD PARTS COMPANY, OF CLEVELAND, OHIO, A CORPORATION OF OHIO.

RIM FOR VEHICLE-WHEELS.

1,268,210.   Specification of Letters Patent.   Patented June 4, 1918.

Application filed May 4, 1911. Serial No. 625,079.

*To all whom it may concern:*

Be it known that I, RICHARD S. BRYANT, a citizen of the United States, residing at Akron, in the county of Summit and State of Ohio, have invented a certain new and useful Improvement in Rims for Vehicle-Wheels, of which the following is a full, clear, and exact description, reference being had to the accompanying drawings.
This invention relates to rims for vehicle wheels of the type designed to secure a pneumatic or other resilient tire in place thereon so as to hold the same securely under all conditions of use and yet be readily and easily removable from the wheel for purposes of repair or replacement. These rims are usually formed with an upstanding flange at each side to engage the sides of the tire, said flanges either being hooked inwardly so as to securely grasp the lips of a tire of the clencher type, or left with a straight side for the reception of a tire of the straight wall or "Dunlop" type. Various expedients have heretofore been employed for facilitating the removal of the tire from the wheel, one of these expedients being the formation of the rim itself so as to be easily detachable from the felly of the wheel, with or without first removing the tire therefrom. With this construction it is possible for an automobile to carry a reserve tire already equipped with a rim, so that in case one of the tires in use becomes disabled it can be readily removed, rim and all, and the reserve tire and rim substituted therefor. This construction permits delaying the removal of the tire from the rim until the garage is reached where the necessary tools can be obtained. Another expedient has been the formation of the rim, with one at least, of said side flanges detachably secured thereto so as to be easily removed and permit the tire to be drawn therefrom without hindrance.
The object of this invention is the provision of a rim which can be readily and expeditiously removed from the wheel without the use of special tools and irrespective of whether the tire be, or be not, first removed, and which shall be securely held upon the rim under all conditions of use; the provision of a rim of this type which, when secured in place upon the wheel, shall serve to reinforce the wheel; the provision of a split rim having improved means for drawing together the abutting ends thereof and clamping the same securely about the felly; and the provision of a split rim having means for drawing together the abutting ends thereof which shall take up the smallest possible amount of space, and shall weaken the wheel felly to the least possible degree. Another object of this invention is the provision, in combination with a rim of this type, of a detachable side flange therefor, which can be easily and expeditiously removed therefrom when necessary, and which shall be held securely thereupon independently of whether the ends of the rim be brought closely together or not; the provision of a split rim of this character having a reversible tire engaging flange at each side thereof, and means for retaining said flanges upon said rim which shall be equally efficient whether the rim be in expanded or contracted condition; while further objects and advantages will be made apparent in the course of the following description and claims.

Figure 14:
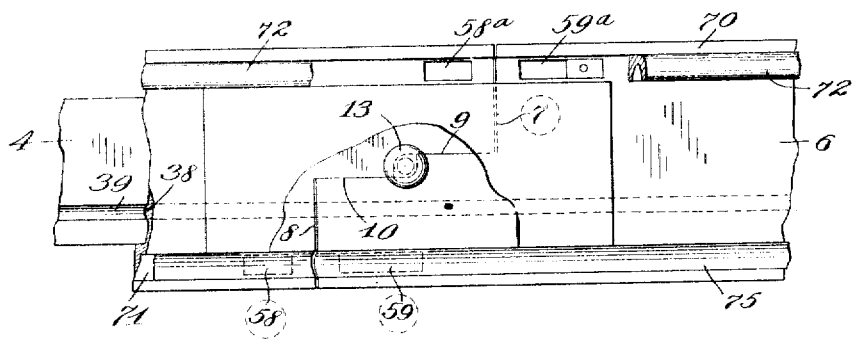
Figure 15:
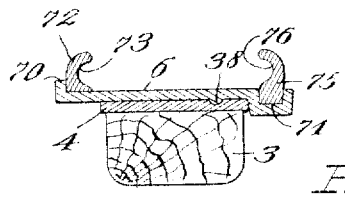
Figure 16:
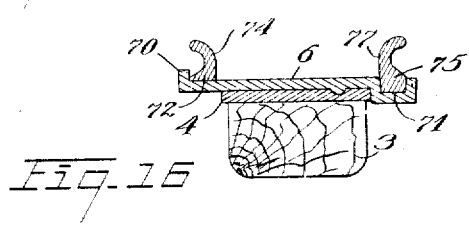

Generally speaking, my invention may be defined as consisting of the combinations of elements embodied in the claims hereto annexed and illustrated in the drawings forming part hereof, wherein: Figure 1 is the side elevation of a wheel provided with my improved rim, a portion thereof being illustrated as broken away; Fig. 2 is a cross sectional view of the rim and felly taken on the line 2—2 of Fig. 1; Fig. 3 is a similar cross sectional view taken on the line 3—3 of Fig. 1; Fig. 4 is a plan view of a portion of the felly band; Fig. 5 is a cross sectional view of the rim and felly taken on the line 5—5 of Fig. 1; Fig. 6 is an inside view of a portion of the felly band and rim, the felly being shown as partially broken away; Fig. 7 is a longitudinal cross sectional view of a portion of the rim and felly illustrating my improved method of securing together the ends of the rim; Fig. 8 is a plan view of the parts illustrated in Fig. 7 viewed from above; Fig. 9 is a detail view illustrating the preferred method of securing the detachable flange to the rim, a portion of the rim being broken away along the line 9—9 of Fig. 8; Fig. 10 is an inside plan view of a portion of the rim showing the constricting device and flange retaining means; Fig. 11 is a perspective view of the retaining block and spring preferably employed in retaining the flange in place; Fig. 12 is an enlarged perspective view of the rivet preferably employed with said spring; Fig. 13 is a side view of a portion of a rim illustrating a modified expedient for engaging the felly band, the toggle joint being omitted; Fig. 14 is a top plan view of a rim made in accordance with my invention, illustrating the method of securing a reversible flange at each side thereof; and Figs. 15 and 16 are cross sectional views of said modified form of rim, showing said flanges in reverse positions.

Describing the parts by reference characters, 1 indicates the hub of a vehicle wheel, 2 the spokes, 3 the felly, 4 a flat metallic band surrounding the felly and preferably shrunk thereon, and 5 a resilient tire which in the present instance is illustrated as a pneumatic tire, but which might obviously be of any other suitable type. Upon this felly-band I secure a rim, which consists of a flat annular metallic band 6, cut transversely across at one point and provided with means for drawing together the free ends thereof so as to constrict it about the felly-band. The method of cutting this rim and constricting it will now be described.

The rim is divided by cutting therein a pair of parallel off-set slits 7 and 8 extending from the sides thereof nearly to the middle, and then continuing the slits at right angles to their length as at 9 and 10 respectively, parallel to each other and disposed upon opposite sides of the middle line until they are nearly opposite each other, after which the intervening portion is cut away so as to form the perforation 11 connecting the slits 9 and 10 and completely severing the band. The opposed rim-ends, it will thus be seen, substantially conform to a broken line extending from a point on one edge of the rim to a circumferentially advanced point on the other edge of the rim. A bolt 12 is positioned in the perforation 11, said bolt having a thin rounded head 13 overlying the inside of the band 6 adjacent said perforation and a laterally extending collar 14 overlapping the inside surface of said band opposite said head. With this construction the bolt is held against longitudinal movement in either direction, irrespective of whether the rim is in constricted or expanded condition since the head and collar of the bolt always overlap the edges of the slits 9 and 10. This bolt is threaded for substantially its entire length, and carries a nut 15 having opposite ears or lugs 16, to which are articulated the links 17, the further ends of which are pivoted to lugs 18 formed upon the inner surface of the band 6, one at each side of the break therein. The links 17 are preferably arranged in pairs, one at each side of each of the lugs 16 and 18, and their connection to said lugs is effected by means of rivets 19. The outer end of the bolt 12 is preferably squared as at 20 for the reception of a wrench, by means of which the same may be turned. This construction produces a toggle joint, which, when buckled, serves to draw the ends of the rim securely together and to constrict the same firmly upon the exterior of the felly band.

This toggle joint is preferably carried upon the middle line of the rim as illustrated in Figs. 2, 8, 10 and 14, and the felly band is provided with an elongated slot 25 for its reception. Below this slot the felly itself is recessed as at 26 to receive the toggle, the interior of said recess being closed except for a perforation 27 through which the bolt 12 passes. In applying the rim to the felly, the bolt 12 is first inserted through the slot 25 and recess 26, the rim being suitably inclined, as regards the plane of the wheel, to permit the further side thereof to be passed over the felly. The outer wall of the recess 26 is preferably undercut as at 28 in order to facilitate the necessary inclination of the bolt 12. As soon as the toggle joint has been fully inserted in its recess the further edge of the rim can be slipped over the felly and the rim constricted into place. The valve stem 29 of the tire is preferably projected through the rim at a point adjacent to the bolt 12, so as to be inserted through the felly 3 simultaneously therewith. In Fig. 1 I have shown the bolt and valve stem projecting through the felly between adjacent spokes which I consider the most satisfactory arrangement. I prefer to cover the projecting end of the bolt 12 with a cap 30 having a base flange 31 adapted to close the perforation 27 and prevent the access of water, sand, or other foreign substances to the recess 26.

In order to prevent the shifting or creeping of the rim around the felly band, I prefer to form the rim with spaced projections 35 carried by its inner surface, and adapted to fit in recesses 36 formed in the felly band. In the embodiment illustrated in Figs. 3 and 4, these projections take the form of the heads of rivets, the bodies 37 of which are upset upon the inside of the rim, and the recesses 36 assume the form of perforations stamped or otherwise conveniently formed. In Figs. 13 to 16 inclusive I have illustrated a second expedient for accomplishing the same, which consists in rolling or otherwise forming the inner surface of the rim with a circumferentially extending rib 38, and forming the felly band with a correspondingly shaped recess 39 adapted to receive said rib. In Figs. 1, 5 and 6, I have illustrated a third expedient for accomplishing the same result, which expedient may be employed either alone or in combination with one of the expedients described above. This consists in forming a lateral notch 40 in the side of the felly band substantially opposite to the recess 26, and forming the interior of the rim with a projection or lug 41 adapted to enter this notch. With this construction the lug 41 is the last thing to become seated as the rim is applied to the felly band, so that its presence does not interfere with the assembling.

Up to this point the description has assumed the use of a simple rim of the type with both flanges fixed in position thereon, and the construction described exhibits many points of value in connection with such a device, as will be obvious. I prefer, however, to form one of said flanges removable, in order that the application of the tire to the rim may be facilitated, and to permit ready repairs to be made upon the road in case the number of extra tubes and shoes should exceed the number of spare rims. According to my preferred construction, the outer edge of the band 6 is bent inwardly as at 50 so as to lie against the outer edge of the felly band, and the extremity of this portion is then bent outwardly and upwardly as at 52, so as to provide an outwardly facing groove 53, the outer wall of which extends to no greater diameter than the surface of the rim 6. The shape of this groove is preferably the same as that described and claimed in my copending application of even date herewith and bearing Serial Number 625,078. In this groove I secure a removable flange 54, having its outer portion shaped similarly to the flange carried by the opposite side of the rim and having its inner portion shaped to fit snugly in the groove 53. This flange is cut across at 55 so as to form a split ring, and each of the ends thereof is provided with an internal projection 56 having a forwardly extending toe 57. The bottom of the groove 53 is formed with slots 58 and 59 adjacent the slit 8, each of which is adapted to receive one of the projections 56. Between the slots and the ends of the rim, the transverse webs 58ª are left, and beneath these webs the toes 57 are adapted to engage. The slot 58 is preferably only slightly longer than the corresponding projection, but shorter than the projection plus its toe 57, and the projection is inserted therein, toe first, the necessary canting of the ring being permitted by the beveled or cutaway portion 59. The ring is then seated in the groove so as to bring the rear end of the projection against the rear end of the slot and wedge the toe 57 firmly beneath the web 58. The other projection can be freely entered through the slot 59 because of the greater length thereof, and the space between the end of that slot and the rear end of the projection is taken up by means of the block 60, or in any of the other manners disclosed in my copending application above referred to. This block is illustrated as carried upon the spring 61 secured to the rim by means of a rivet 62 or the like. I have illustrated herein my preferred method of securing said filling block in place and of securing said spring to the rim, although it is to be understood that I do not limit myself to any such expedients except as the same are specifically recited in those of the appended claims in which my invention is so expressly limited. This construction brings the slit 55 in the flange substantially opposite the slit 8 in the rim, and assures that the rim and flange shall be expanded and contracted as a unit, in applying the same to the wheel.

In Figs. 13 to 16 inclusive I have illustrated a construction in which both the rim flanges are made reversible so as to be used in connection with tires of different shapes. In these views the rim band 6 is provided at one side with the shallow lip 70 and at the opposite side with the symmetrical groove 71, said groove being made in the same manner as the groove 53 above described. Adjacent the lip 70 and upon opposite sides of the slits 7 are formed the slots 58ª and 59ª, and in the bottom of the groove 71 are formed the slots 58 and 59 as before. Surrounding the rim adjacent the lip 70 is the split ring 72, having one side undercut as at 73 and adapted to engage the lip of a clencher tire as shown in Fig. 15 and having the other side flat as at 74 to engage the side of a straight wall tire as shown in Fig. 16. This ring is secured in place by means of projections secured in the slots 58ª and 59ª in the manner hereinbefore described. Mounted in the groove 71 is the reversible split ring 75, having one side undercut as at 76 to oppose the undercut side 73 of the ring 72, and having the other side straight as at 77 to oppose the wall 74 of the ring 72. The ring 75 is secured in the groove by means of projections secured in the slots 58 and 59 in the manner hereinbefore described. With this construction both the rings 72 and 75 are securely held against shifting or creeping about the rim, and are forced to expand and contract at the same time with the rim when the same is applied or removed from the wheel with which it is used.

It will be understood that the expedient disclosed herein for constricting the split rim about the wheel can be employed either with or without making either or both of the tire engaging flanges detachable therefrom. It will also be understood that my detachable flanges can be used either with or without the expedient of splitting the rim; this feature has however been covered by the claims of my copending application above referred to. It will furthermore be appreciated that my expedient of securing the detachable flanges to the split rim is of great importance in the combination since it assures the close connection of the flanges thereto in all conditions of the rim, and without losing the advantages of a quick detachable flange. It will also be understood that I do not confine myself solely to the means of securing said flange in place described in this application, but claim as within the scope of that combination all the expedients described and claimed in my copending application. Furthermore, while I have described my invention in detail and shown it as employed in connection with a pneumatic tire, I do not propose to be limited to such use, as certain features of construction thereof are of more general application; neither do I propose to be limited to details of construction except as the same may be positively included in the claims hereto annexed or may be rendered necessary by the prior state of the art.

Having thus described my invention, what I claim is:

1. The combination with a transversely split tire-supporting rim for vehicle wheels; of a member projecting radially inwardly from a point on said rim adjacent its ends, said member being held against longitudinal movement relatively to said rim; a second member longitudinally adjustable along said first member; and links connecting said second member with the ends of said rim and forming a toggle.

2. The combination with a transversely split tire-supporting rim for vehicle wheels; of a bolt projecting radially inwardly from a point on said rim adjacent its ends, said bolt being rotatable but longitudinally fixed relatively to said rim; and a toggle having its end members attached to the ends of said rim and having its middle member threaded upon said bolt.

3. The combination with a transversely split tire-supporting rim for vehicle wheels, the split in said rim extending from a point on one edge of said rim to a circumferentially advanced point on the other edge of said rim; of a member projecting radially inwardly from a point on said rim adjacent its ends, said member being held against longitudinal movement relatively to said rim; a second member longitudinally adjustable along said first member; and links connecting said second member with the ends of said rim and forming a toggle.

4. The combination with a transversely split tire-supporting rim for vehicle wheels, the split in said rim extending in a broken line from a point on one edge of said rim to a circumferentially advanced point on the other edge of said rim; of a member projecting radially inwardly from a point on said rim adjacent its ends, said member being held against longitudinal movement relatively to said rim; a second member longitudinally adjustable along said first member; and links connecting said second member with the ends of said rim and forming a toggle.

5. The combination with a transversely split tire-supporting rim for vehicle wheels having its ends provided with projections extending laterally past each other; of a member held in longitudinally fixed position between said projections; a second member longitudinally adjustable along said first member; and links connecting said second member with the ends of said rim and forming a toggle.

6. The combination with a transversely split tire-supporting rim for vehicle wheels having its ends provided with projections extending laterally past each other; of a member held between said projections so as to be rotatable but longitudinally fixed; a second member having threaded engagement with said first member so as to be adjustable therealong upon rotation of said first member; and links connecting said second member with the ends of said rim and forming a toggle.

7. The combination with a transversely split tire-supporting rim for vehicle wheels having its ends provided with projections extending laterally past each other; of a bolt held between said projections so as to be rotatable but longitudinally fixed; a nut threaded upon said bolt; and links connecting said nut with the ends of said rim and forming a toggle.

8. The combination with a transversely split tire-supporting rim for vehicle wheels having its ends provided with projections extending laterally past each other; of a bolt rotatably held between said projections and having its head overlapping the adjacent edges thereof; a nut threaded upon said bolt; and links connecting said nut with the ends of said rim and forming a toggle.

9. The combination with a transversely split tire-supporting rim for vehicle wheels having its ends provided with projections extending laterally past each other, said projections being spaced apart; of a bolt rotatably secured in the space between said projections and having its head overlapping the adjacent edges thereof; a nut threaded upon said bolt and having laterally extending ears; ears carried by the adjacent ends of said split ring; and links pivotally connecting the ears on said nut and rim, respectively, and forming a toggle joint.

10. In a vehicle wheel, the combination with a felly; of a transversely split tire-supporting rim adapted to be clamped about said felly; a member projecting radially inwardly from a point on said rim adjacent its ends, said member being held against longitudinal movement relatively to said rim; a second member longitudinally adjustable along said first member; and links connecting said second member with the ends of said rim and forming a toggle, said felly being recessed to accommodate said members and toggle-links.

11. In a vehicle wheel, the combination, with a felly having a metallic felly band therearound, said band having a slot therethrough at one side and said felly being formed with a recess registering with said slot, of a metallic rim made in the form of a split ring adapted to be clamped about said felly band, a bolt rotatably but non-translatably secured to said rim adjacent the split therein, and a toggle joint having its end members secured to the ends of said ring and its middle member threaded upon said bolt, said toggle joint being adapted to be received within said recess when said rim is clamped about said band.

12. In a vehicle wheel, the combination with a felly and felly band therearound, said band having a slot therethrough at one side and said felly being formed with a recess registering with said slot, the wall of said recess having a perforation therethrough; of a transversely split tire-supporting rim adapted to be clamped about said felly band; a bolt extending radially inward from said rim and rotatably but non-translatably secured thereto; and a toggle joint having its end members secured to the ends of said rim and having its middle member threaded upon said bolt, said toggle joint being adapted to be received in said recess and said bolt to extend through said perforation.

13. In a vehicle wheel, the combination with a felly having a metallic felly band therearound, said band having a slot therethrough at one side and said felly being formed with a recess registering with said slot, said band having a laterally opening notch formed in the outer side thereof at a point opposite said slot; of a transversely split tire-supporting rim adapted to be clamped about said felly band; means associated with said rim and adapted to be received in said recess for drawing the ends of said rim together; and a lug or projection carried by one side of said rim opposite said means and adapted to be received in said notch.

14. The combination with a transversely split tire-supporting rim for vehicle wheels; of a link pivoted to each end of said rim, the inner ends of said links being pivoted to a nut and forming together a toggle joint; and a bolt in said nut and swiveled to said rim so as to prevent longitudinal movement, whereby said toggle joint will be buckled when said bolt is turned.

15. The combination with a transversely split tire-supporting rim for vehicle wheels having its ends provided with projections extending past each other; of a bolt extending radially through said rim between said projecting portions and having a head and a collar spaced from each other and receiving the edges of said projections therebetween; and a toggle joint having its end members secured to the ends of said rim and having its middle member threaded upon said bolt.

16. A split tire-carrying rim in combination with a positive rim expanding and contracting mechanism comprising a screw rotatably mounted in the rim adjacent to the split, extending radially inward and held against relative radial movement, a nut movable radially in reference to the rim when the screw is rotated, and links operatively joining the nut with the two ends of the rim.

17. A split tire-carrying rim in combination with a screw rotatably mounted in the rim adjacent to the split and projecting radially inwardly, circumferential shoulders on the screws engaging the rim and preventing relative radial movement, a nut mounted on the screw and adapted to be moved from or toward the rim when the screw is rotated, and links having pivotal connection with the nut and the two ends of the rim, whereby when the nut is moved from or toward the rim the rim will be contracted or expanded.

18. A tire rim in the form of a ring split or severed at one point in its circumference, in combination with a radially movable member arranged within the rim and adjacent to the cut, links connecting the radially movable member with each end of the rim, and means for moving the member radially in reference to the rim and for holding it in its position.

19. A mounting for a pneumatic tire comprising a split rim in combination with a screw projecting radially inward from the rim and rotatably mounted at its outer end in the rim adjacent to the split, a non-rotatable nut mounted on the screw, and toggles linking the nut to each end of the rim.

In testimony whereof, I hereunto affix my signature in the presence of two witnesses.

RICHARD S. BRYANT.

Witnesses:
 HAROLD E. SMITH,
 ALBERT H. BATES.